F. J. MORGAN.
SEAT.
APPLICATION FILED JAN. 23, 1915.
1,207,599.
Patented Dec. 5, 1916.
3 SHEETS—SHEET 1.
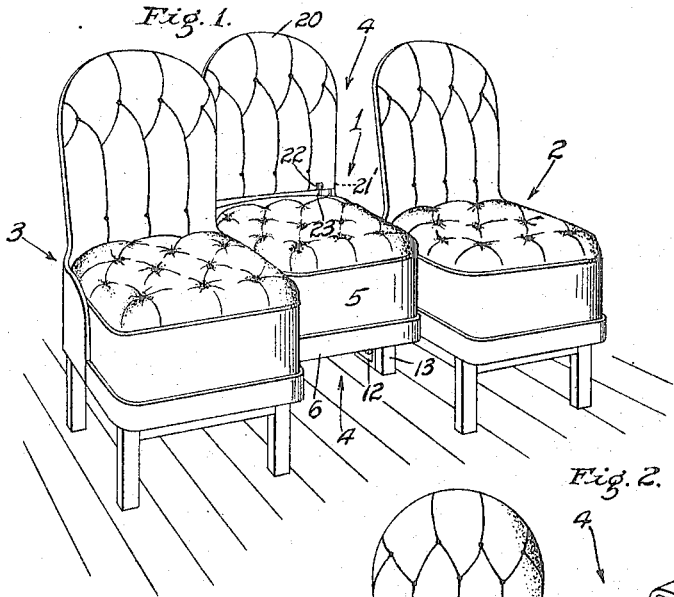
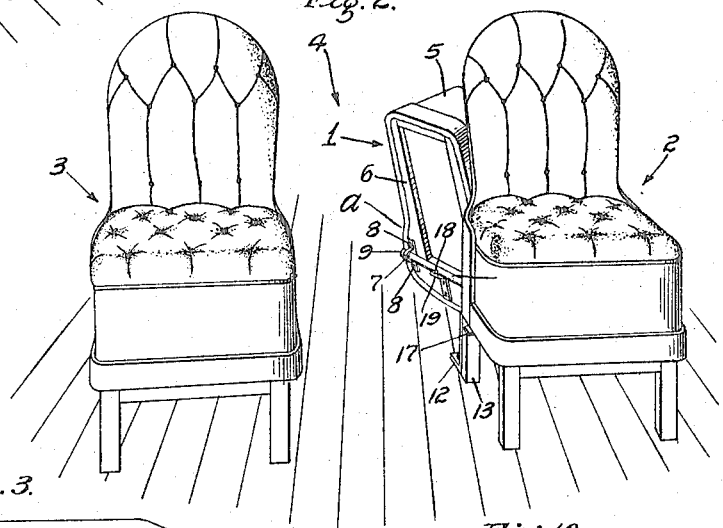
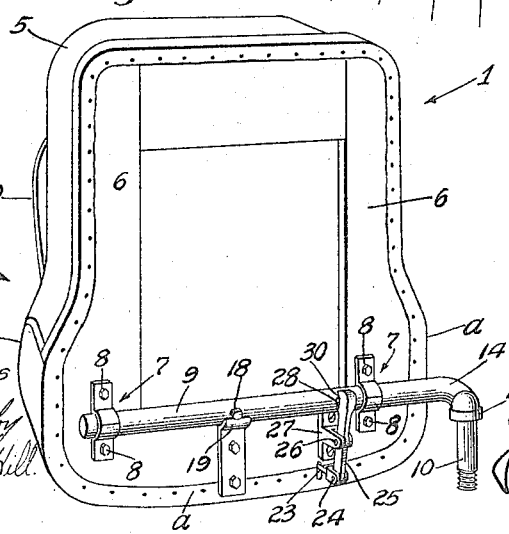
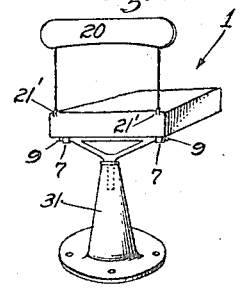
Witnesses
W. N. Kirkby
Estella Hill
Inventor
Franklyn J. Morgan
by James R. Townsend
his atty.

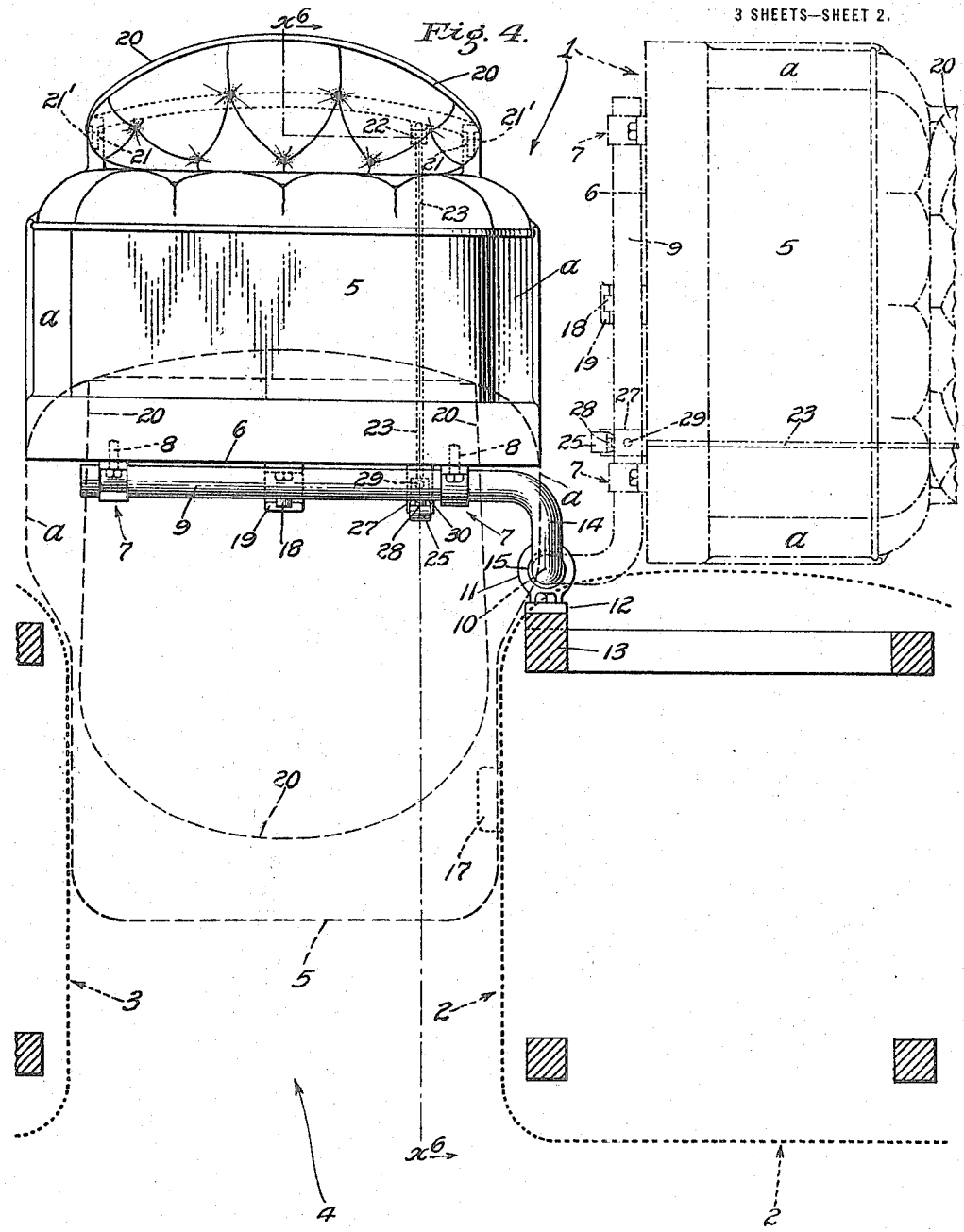

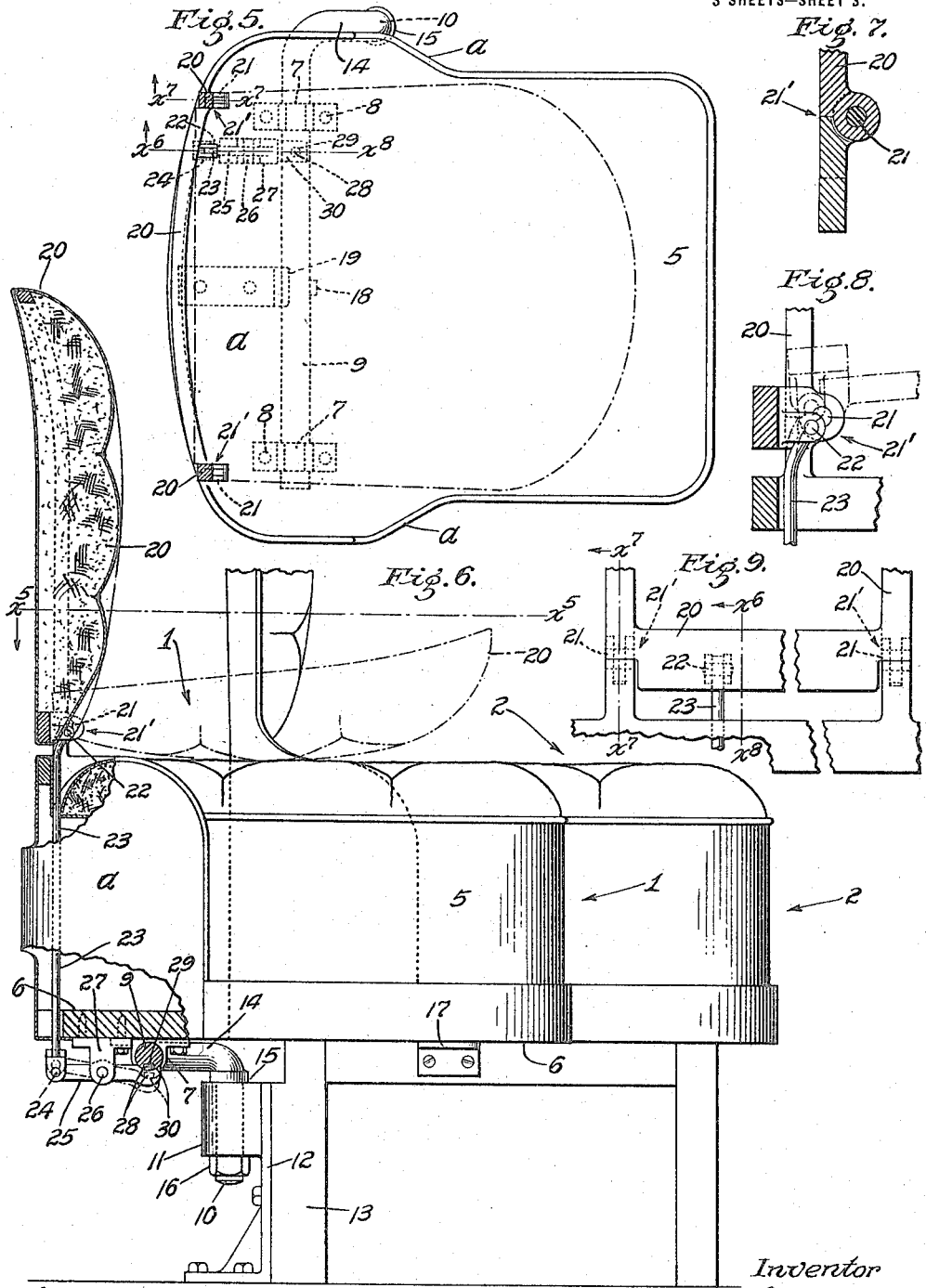

UNITED STATES PATENT OFFICE.

FRANKLYN J. MORGAN, OF LOS ANGELES, CALIFORNIA.

SEAT.

1,207,599.    Specification of Letters Patent.    Patented Dec. 5, 1916.

Application filed January 23, 1915. Serial No. 4,065.

*To all whom it may concern:*

Be it known that I, FRANKLYN J. MORGAN, a citizen of the United States, residing at Los Angeles, in the county of Los Angeles and State of California, have invented a new and useful Improvement in Seats, of which the following is a specification.

This invention relates to seats designed for the utilization of passageway space when the passage in such way is not required. An instance of a place where the invention may be found especially advantageous and desirable is that of a seat in an automobile of the Sedan type body where the passenger may enter either in front or behind the seat that is to be occupied and passes along the car beyond the place where the passenger is to be seated. In such a situation the seat may be of a multiple character comprising a plurality of seat units one or more of which may be stationary and another made to embody the novel parts of the invention which will hereinafter be particularly pointed out.

Objects of the invention are convenience, utilization of the passageway for seat space, ease of putting the seat into and out of commission for seating the occupant and for clearing the passageway, and compactness and cheapness of installation.

I regard the invention as pioneer in that it embraces a tiltable and swinging seat and in that it comprises a support and a seat tiltable and swingingly mounted on said support so that by mounting the support at the side of a passageway the seat may be disposed of with great facility and expedition when the passageway is to be used, and may as readily be returned for use as a seat. In the preferred embodiment of the invention provision is made for automatically locking the seat bottom in and unlocking it from the use position.

The invention may be carried out in various ways and I do not limit it to specific forms of construction although the invention comprises certain specific features which will be more particularly described and pointed out in the appended description and claims.

The accompanying drawings illustrate the invention in an embodiment adapted to various situations.

Figure 1 is a perspective view of a multiple seat comprising three units embodying this invention in a preferred form; said units when in position for use having a relative plan arrangement corresponding to that shown in my Letters-Patent of the United States No. 1,039,780, patented Oct. 1, 1912, for automobile body and seats, and No. 1,078,602, patented Nov. 11, 1913, for automobile seat construction. Fig. 2 is a perspective view of the same multiple seat showing the tiltable swinging seat unit swung partly aside. Fig. 3 is a perspective view showing the tiltable swinging seat bottom detached from its support. Fig. 4 is a fragmental plan of the invention embodied as shown in Figs. 1, 2 and 3. Solid lines show the seat tilted up preparatory to being swung out of the passageway. Dash lines indicate in outline the tiltable swinging seat bottom in horizontal position, and the seat back in folded position. Dot and dash lines indicate the seat bottom and folded back swung aside from the passageway. A fragment of one of the stationary seat units with seat bottom support fixed thereto is shown in solid lines and the outlines of adjacent portions of the bottoms of the stationary seat units are shown in dotted lines. Fig. 5 is a plan of the swinging tiltable seat unit; the back being sectioned on line $x^5$, Fig. 6. Fig. 6 is an elevation, partly in section on line $x^6$—$x^8$, in Fig. 5, of the swinging tiltable seat unit and a stationary seat unit next to it. Fig. 7 is a fragmental sectional detail elevation from line $x^7$, Figs. 5 and 9. Fig. 8 is a fragmental sectional detail on line $x^6$—$x^8$, Fig. 9. Fig. 9 is a fragmental rear elevation of the frame of the tiltable swinging seat unit. Fig. 10 is an elevation showing the swinging tiltable seat unit mounted upon an isolated support.

Short arrows on the section lines indicate the direction of sight.

A tiltable and swinging seat unit 1 may be located between two other seat units 2, 3 that are temporarily or permanently fixed with relation to each other and stationed to leave between them a passageway 4 wide enough to receive a narrowed forward portion 5 of the seat bottom 6 of the tiltable swinging seat unit. The stationary seat units 2, 3 may be of any desired construction and each may be of any desired size so that each will accommodate one person. The seat unit 1 is tiltably and swingingly mounted so that it may be swung into and out of the passageway and is of a size to accommodate one person so that in the form shown in Figs. 1 and 2 the whole multiple seat made up of units 1, 2, 3, accommodates three persons when the swinging seat unit 1 is in commission.

The seat unit 1 may be provided with a rigid bottom 6 and with bearings 7 alined with each other and fixed by any suitable means, as the bolts 8, to the underside of said bottom rearwardly of the center thereof. Said bottom 6 may be widened at the rear as shown at $a$ to accommodate the hips and body of a seated person, and may be narrowed sufficiently at the forward part 5 for the accommodation of the person's legs.

A horizontal swinging axle 9 is pivotally mounted by a vertical pin 10 in a bearing 11 carried by a bracket 12 that is fixed to a support 13 which in the form shown in Figs. 1, 2, 4, 5 and 6 may be one leg of a stationary seat unit. Said swinging axle is journaled in the bearings and is provided with an intermediate offset arm 14 in angular relation to the axle 9 and pin 10 and terminates in said vertical pin 10 that is integral with said arm and with the swinging and journaled axle. The axle is held against rotation by means of the pin seated in the vertical stationary bearing 11. The seat bottom 6 is thus tiltably mounted on the axle to tilt up and back.

The pin 10 is insertible vertically into and removable from the pivotal bearing 11 and has a shoulder 15 to rest on the top of bracket 12, and is secured by nut 16 below the bearing.

A seat bottom support 17 in fixed relation to the stationary seat units 2, 3 and conveniently mounted on the seat unit 2 forwardly of the pin 10 at the same side therewith of the passageway 4 and at about the level of the axle 9, supports the narrowed forward portion 5 of the seat bottom when said seat bottom is in horizontal position, so that normally the seat bottom is supported in horizontal position by the axle 9 and seat bottom support 17.

Stop means are provided on and are operable between the swinging axle and the seat unit to limit the backward tilting movement of the seat bottom, so that when the seat bottom is overbalanced rearwardly it will be stopped by said stop means and will be held by gravity in a nearly upright position. Such stop means are shown in the form of a detent stud 18 on the axle, and a stop lug 19 fixed to the seat bottom and engaging the detent stud when the seat bottom is overbalanced backward on the axle as shown in Fig. 3.

The seat bottom is mounted so far forwardly relative to the axle that it is held stable by gravitation when lowered, but in order to fix it in the lowered position, latch means are provided therefor. Said latch means are preferably constructed and arranged as shown so as to be automatically operated by a folding seat back 20 as said seat back is folded and unfolded toward and from the seat bottom 6.

The seat back 20 and seat bottom 6 are connected by the hinge pins 21 of a knuckle or lazy back hinge 21', and operates through eccentric pin 22 connecting rod 23 and pivot 24 with a latch bar 25 pivoted to the seat bottom 6 by a pin 26 carried by a bracket 27. Said latch has a stud 28 to fit a detent seat 29 in the axle 9 and is provided with a notch 30 to fit the periphery of the axle; the stud 28 being in and projecting from the bottom of said notch and fitting the detent seat.

In practice the tiltable swinging seat bottom may be located in any passageway wide enough to accommodate the narrowed forward portion when the seat bottom is horizontal and the seat back raised, and it is understood that in some instances the tiltable swinging seat unit may be installed independently of any other seats as indicated in Fig. 10 where the axle 9 is mounted on a post 31 fixed to the floor.

In the construction where two or more seats are employed as indicated in Figs. 1 and 2 the wider rear portion $a$ is too wide to enter the passageway, the same being of sufficient width to accommodate the hips and body of the seated person, rearward of the back of the adjacent seat or seats; while at the same time the forward narrowed portion 5 is of sufficient width to accommodate the legs of the seated person.

When it is desired to remove the seat from the passageway the seat back will be folded forward, thus releasing the latch whereupon the seat and the back are tilted backward until they overbalance on the axle and the stop means 18, 19 prevent the seat from any further backward movement.

It is understood that the seat back may be rigidly mounted on the seat bottom and the connecting rod dispensed with, and that the latch bar in such case could be manually operated and also that the latch might be omitted without relinquishing what I at present regard as the most important advantages gained by my invention. These omissions and other changes within the skill of the constructor may be made without departing from the broad spirit of the invention.

I claim:

1. The combination with two seat units spaced apart to form a passageway, of a support in fixed relation thereto, a seat bottom resting upon the support, said seat bottom partly fitting in the space between said seat units and partly extending back thereof, a horizontal swinging axle terminating at one end in a vertical bar which is mounted to swing the axle across the passageway between said seats behind said support, and journal bearings in transverse alinement near the rear end of said seat bottom and connecting the seat bottom with said axle whereby the seat bottom may be tilted up from said support, and then swung from said passageway.

2. The combination with two seat units spaced apart to form a passageway, of a support in fixed relation thereto, a seat bottom resting upon the support, said seat bottom partly fitting in the space between said seat units and partly extending back thereof, a horizontal swinging axle terminating at one end in a vertical bar which is mounted to swing the axle across the passageway between said seat units behind said support, journal bearings in transverse alinement near the rear end of said bottom and connecting the seat bottom with said axle whereby the seat bottom may be tilted up from said support and then swung from said passageway, and a back hinged to the seat bottom behind said axle, and foldable toward the seat bottom to stand up out of the way when the seat bottom is tilted and swung out of the passageway.

3. The combination with a stationary seat unit, of a horizontally swinging axle terminating at one end in a vertical bar which is rotatably mounted at the rear thereof, a support on said seat unit, and a seat bottom transversely journaled to the axle to rest on said support and tiltable on the axle for removal from said support and swinging with said axle to open a passageway alongside said seat unit.

4. The combination with a stationary seat unit, of a swinging axle terminating at one end in a vertical bar which is rotatably mounted at the rear thereof, a support on said unit, a seat bottom transversely journaled to the axle to rest on said support and tiltable on the axle for removal from said support and swinging with said axle to open a passageway alongside said seat unit, and a latch carried by said seat bottom to latch the seat bottom in horizontal position.

5. The combination with a support, of a horizontal swinging axle terminating at one end in a vertical bar which is rotatably mounted rearwardly of said support, a seat bottom transversely journaled to said axle and resting on said support, and a seat back hinged to the seat bottom rearwardly of said axle to fold forward toward the seat bottom.

6. The combination with a support, of a horizontal swinging axle terminating at one end in a vertical bar which is rotatably mounted rearwardly of said support, a seat bottom resting on said support and transversely journaled to said axle and tiltable thereon from said support, and stop means coöperating between said seat bottom and axle to prevent the seat bottom from tilting too far back when overbalanced rearwardly of said axle.

7. The combination with a support, of a horizontal swinging axle terminating at one end in a vertical bar which is rotatably mounted rearwardly of said support, a seat bottom resting on said support and transversely journaled to said axle and tiltable thereon from said support, stop means coöperating between said seat and axle to prevent the seat bottom from tilting too far back when overbalanced rearwardly of said axle, and latch means carried by the seat bottom and engaging the axle to hold the seat bottom against turning upwardly on the axle when the seat bottom is horizontally at rest on the support.

8. The combination with a swinging axle terminating at one end in a vertical bar, of a seat bottom tiltably and transversely mounted on the axle, and support means acting in conjunction with said vertical bar and said axle to support said seat bottom in horizontal position.

9. The combination with a swinging axle terminating at one end in a vertical bar, of a seat bottom tiltably and transversely mounted on the axle, means acting in conjunction with said vertical bar and said axle to support said seat bottom in horizontal position, and means carried by the seat bottom and engaging the axle to lock the seat bottom in horizontal relation to the axle.

10. The combination with a swinging axle terminating at one end in a vertical bar, of a seat bottom tiltably and transversely mounted thereon, means acting in conjunction with said vertical bar and said axle to support said seat bottom in horizontal position, and a latch carried by the seat bottom and engaging the axle to hold the seat bottom in such position.

11. The combination with a swinging axle terminating at one end in a vertical bar having supporting means therefor, of a seat bottom transversely journaled to the axle, means acting in conjunction with said vertical bar and said axle to support said bottom in horizontal position, a latch carried by the seat bottom and engaging the axle to hold the seat bottom in such position, a seat back hinged to the seat bottom, and means operably connecting said seat back with said latch to release the latch when the seat back is folded forward.

12. The combination with a support, of an axle mounted to swing relative to said support, a seat bottom tiltably mounted on the axle, said support operating in conjunction with the axle to support the seat bottom in horizontal position, a latch carried by the seat bottom to engage the axle, a seat back hinged to the seat bottom and foldable forward thereon, and a connecting rod operably connecting the latch with the seat back to release the latch when the seat back is folded and to latch the latch when the seat back is raised.

13. In a swinging tiltable seat unit, the combination with a seat bottom, of a horizontal axle terminating at one end in a vertical bar and being transversely journaled to said seat bottom and provided with a stop, means engaging said bar to hold the axle against rotation, and a stop fixed to the seat bottom to engage the stop on the axle when the seat bottom is tilted backward to overbalanced position.

14. In a swinging tiltable seat unit, the combination with a seat bottom of a horizontal swinging axle terminating at one end in a vertical bar and being journaled to said seat bottom; means engaging said bar to hold the axle against rotation; said axle being provided with a stop, a notch, and a detent in said notch; stop means fastened to the seat bottom to engage the stop when the seat bottom is tilted to overbalance backward; and a latch pivotally connected to the seat bottom and running in said notch to engage the detent therein when the seat bottom is in horizontal position.

15. A swinging tiltable seat unit comprising a horizontal swinging axle fixed against rotation and provided with a stop and with a notch and a detent in said notch; stop means fastened to the seat bottom to engage the stop when the seat bottom is tilted to overbalance backward, and a latch pivotally connected to the seat bottom and running in said notch to engage the detent therein when the seat bottom is in horizontal position; a seat back hinged to the seat bottom and operably connected to latch and unlatch the latch as the seat back is folded forward and stood up.

16. A seat bottom, a seat back pivoted to fold toward the seat bottom, an axle upon which the seat bottom is tiltably and transversely mounted, latch means carried by the seat bottom to hold the seat bottom from tilting, means operably connecting the seat back and the latch to release the latch means when the seat back is folded toward the seat bottom and to cause the latch means to engage when the seat bottom is lowered and the seat back is raised to upright position.

17. The combination with a seat bottom and a seat back hinged thereto, of an axle upon which the seat bottom is tiltably mounted, a latch bar and detent coöperating therewith to hold the seat bottom in horizontal position on the axle, a connecting rod connected to the latch bar and a pivot arranged eccentrically of the seat back pivot and connecting the connecting rod with the seat back to operate the latch bar to release the latch when the seat back is folded toward the seat bottom and to latch the latch when the seat bottom is in horizontal position and the seat back raised.

18. The combination of a seat, with a horizontally swinging arm carrying said seat and terminating in a vertical bar provided with supporting means therefor, said seat being transversely fastened to said arm and tiltable thereon, and means at the side of said seat and coacting therewith whereby said arm is prevented from swinging when the seat is horizontal and is free to swing when said seat is tilted.

19. The combination of structures spaced apart to provide a passage between them, with a seat widening rearwardly and being in rearward relation to said structures and with its narrow forward end extending across said passage, a horizontally swinging arm carrying said seat and terminating in a vertical bar provided with supporting means therefor, said seat being transversely fastened to and tiltable on said arm and being shaped to abut against one of said structures to prevent said arm from swinging when said seat is in a horizontal position.

20. In the combination of a seat stationed at one side of a passage, with a second seat widening rearwardly and being mounted beside said first seat in rearward relation thereto in said passage, a horizontally swinging arm carrying said seat and terminating in a vertical bar provided with supporting means therefor, said second seat being transversely mounted to tilt on said arm and to swing horizontally therewith to open said passage, and disconnected stop means at the side of said second seat serving to prevent said seat from being swung when in a horizontal position.

21. In the combination of a seat stationed at one side of a passage, with a second seat widening rearwardly and being mounted in said passage beside said first seat in rearward relation thereto, a horizontally swinging arm carrying said seat and terminating in a vertical bar provided with supporting means therefor, said second seat being transversely mounted to tilt vertically on said arm and to swing horizontally behind the other seat to open said passage.

22. In the combination of a pair of side seats facing in the same general direction and spaced apart sidewise to provide a passage between them with a middle seat widening rearwardly and being in rearward relation to and between said side seats, a horizontally swinging arm carrying said seat and terminating in a vertical bar provided with supporting means therefor, said middle seat being transversely mounted to tilt backward on said arm and to swing therewith toward one side to open said passage and being formed to engage one of said side seats to prevent such swinging when the middle seat is in its normal position.

23. In the combination of a seat, an arm mounted adjacent to the back thereof and arranged to swing horizontally to one side of said seat, said arm terminating at the end outside of said seat in a vertical bar, a second seat tiltably and transversely mounted on said arm and movable therewith into and out of position beside said first named seat, and a support rotatably holding the bar of said arm for supporting said second seat in its horizontal position.

24. In the combination of a pair of side seats facing in the same general direction and spaced apart sidewise to provide a passage between them with a middle seat widening rearwardly and being in rearward relation to and between said side seats, a horizontally swinging arm carrying said seat and terminating in a vertical bar provided with supporting means therefor, said middle seat being transversely mounted to tilt backward on said arm and to swing therewith toward one side to open said passage and being formed to engage one of said side seats to prevent such swinging when the middle seat is in its normal position, a movable seat back, and means controlled by the movement of said seat back for securing said seat in its horizontal position between said side seats.

In testimony whereof, I have hereunto set my hand at Los Angeles, California, this 16 day of January 1915.

FRANKLYN J. MORGAN.

In presence of—
 JAMES R. TOWNSEND,
 OSCAR E. WINBURN.

Copies of this patent may be obtained for five cents each, by addressing the "Commissioner of Patents, Washington, D. C."